Patented Aug. 30, 1932

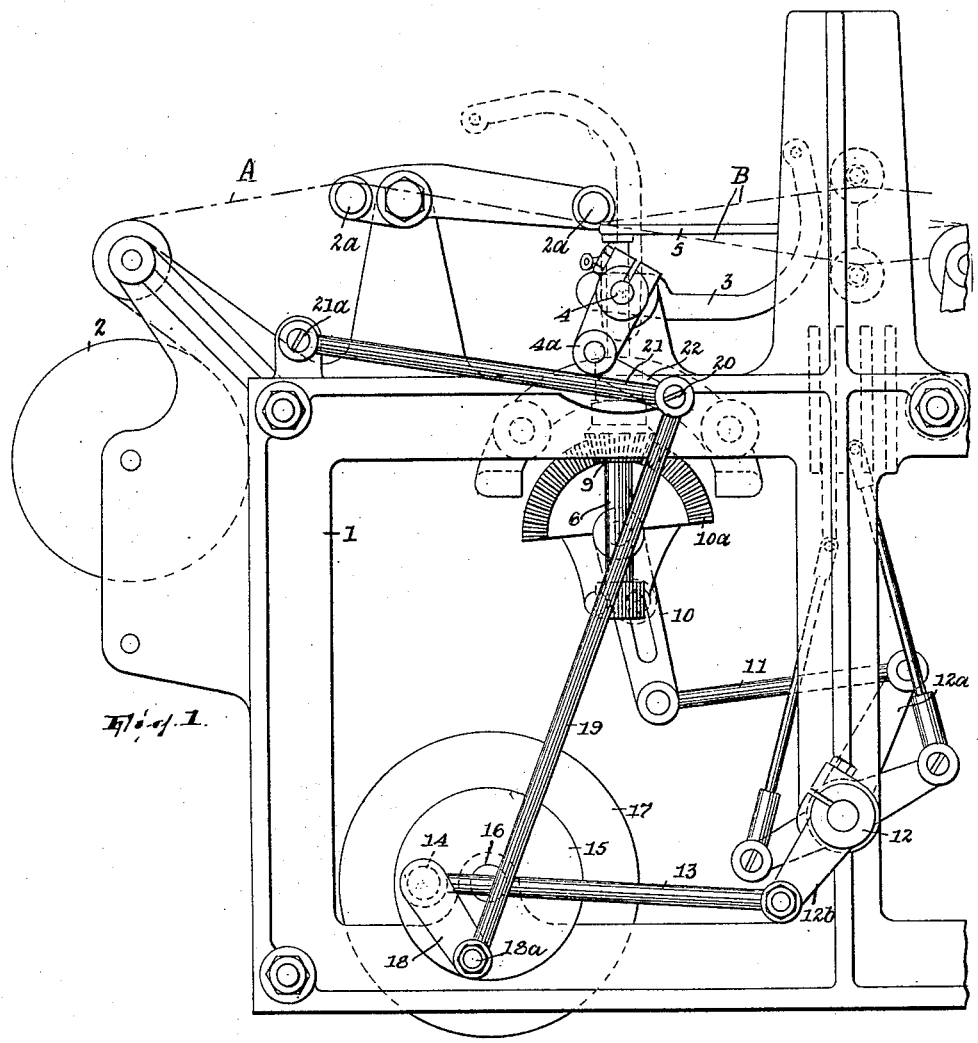

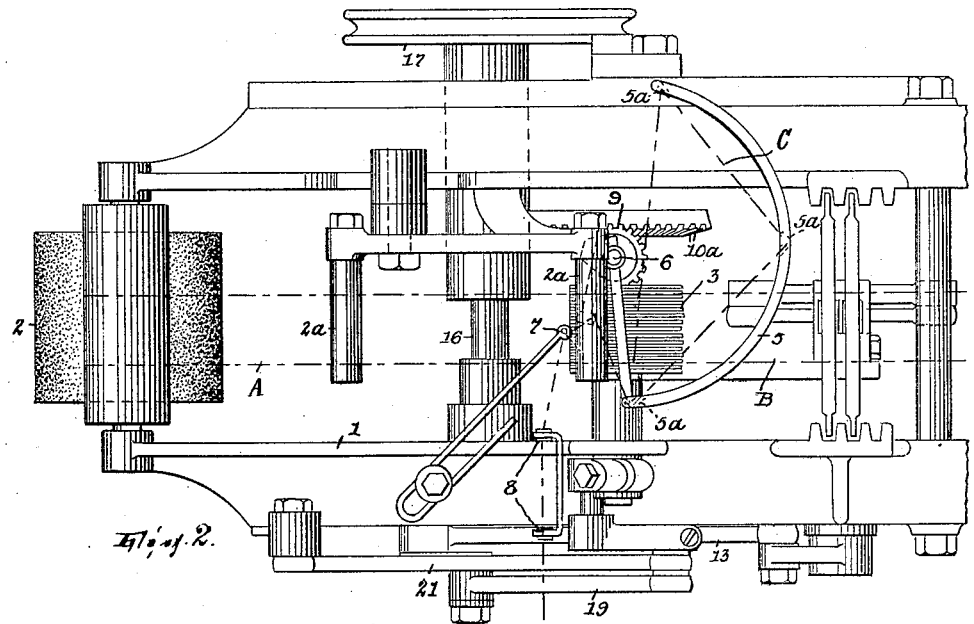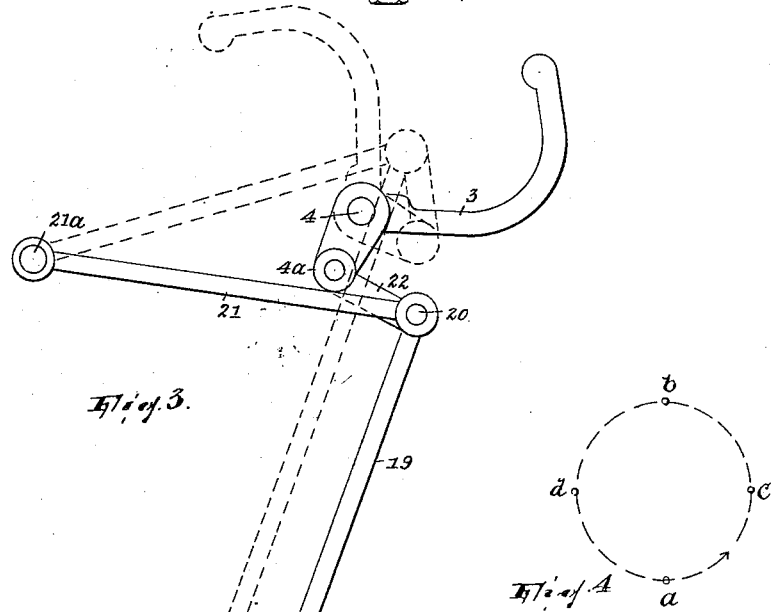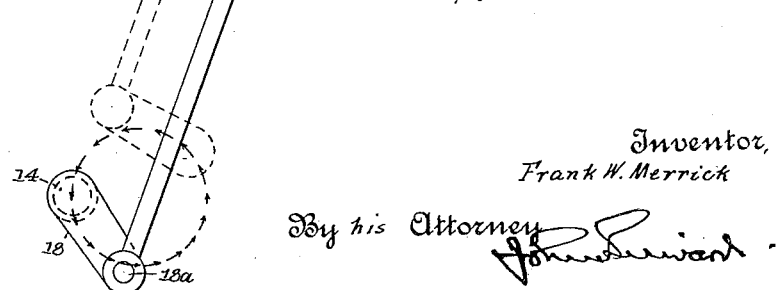

1,875,089

UNITED STATES PATENT OFFICE

FRANK W. MERRICK, OF DORCHESTER, MASSACHUSETTS, ASSIGNOR TO WONDER WEAVE, INC., OF BOSTON, MASSACHUSETTS, A CORPORATION OF MASSACHUSETTS

LOOM

Original application filed February 28, 1930, Serial No. 432,237. Divided and this application filed November 22, 1930. Serial No. 497,447.

The present application constitutes a division of my co-pending Patent No. 1,797,962. The invention relates particularly to that class of looms in which a filling feeder establishes the filling in each shed in the form of a loop, as by having an eye through which the filling, coming from any supply, reeves, for that purpose entering the shed from one side thereof and also returning between shed changes. One object is to provide means for actuating a reed structure or other device for beating up the filling which shall perform quick beating-up movements and stand substantially at dwell between such movements; as to this object it is not of course material whether the reed be used with a filling feeder of the specific kind indicated above or with a filling feeder, as an ordinary shuttle, which perhaps performs its movements, first in one direction and then in the other, in alternation or in some other relation to the shed changes. Another object is to provide a loom having a filling feeder of the kind first indicated above and a forward-and-back moving reed structure with means to coordinate their movements in such a way that the filling will not be subjected to jerks or sudden pulls by the feeder; that the action of the reed shall be effective to beat the filling nicely up to the fell of the cloth; and that nevertheless there shall be no interference between these parts and the loom can further be operated at very high speed.

Fig. 1 is a side elevation of so much of a loom embodying the invention as is pertinent to the latter;

Fig. 2 is a plan thereof;

Fig. 3 is a detached side elevation of the reed operating and controlling mechanism, illustrating the movement and dwell of the reed; and Fig. 4 is a diagram illustrative of the movements of the feeder and reed structure.

1 is the loom frame; 2 represents any suitable take-up means for the sheet of woven fabric A and warp B held stretched between the take-up and some let-off means (not shown) for the warp and engaged with suitable guides 2a; 3 is the reed which is here fixed on a rock-shaft 4 journaled in the frame and having a crank 4a; and 5 is the curved filling feeder here having a straight radial or carrying arm fixed in a vertical oscillatory shaft 6 journaled in the frame and oscillatory back and forth from the position shown in Figs. 1 and 2, where the feeder has introduced the loop of the filling C into a shed formed in the warp, to a position in which the feeder is entirely retracted from the shed, the feeder having guides 5a through which the filling, engaged with fixed guides 7 and 8, reeves on its way from any supply thereof and by which it is (here) maintained in a loop on the feeder. Since we are here concerned only with the feeder and reed, it is not material how the filling is held at the far side of the sheet A—B, as the feeder retracts, so as to leave a loop or "shot" of filling in each shed; nor is it material how the sheds are formed in the warp.

For effecting oscillation of the feeder its shaft 6 has a bevel pinion 9 in mesh with the toothed segment portion 10a of a lever 10 fulcrummed in the frame and connected by a link 11 with an arm 12a of a rocker 12 whose other arm 12b is connected by a link 13 with an eccentric stud 14 of a face plate 15 on the shaft 16 which may be driven by a belt through its pulley 17.

The means for effecting oscillation of the reed is as follows: Stud 14 has affixed thereto a crank 18 to which at a stud 18a is connected a pitman 19 whose free end is pivoted at 20 to a link 21 pivoted to the frame at 21a and which thus confines the pitman to thrustwise movement. Pivoted on pivot 20 and to arm 4a of the reed shaft 4 is a link 22. Any other means to confine the pitman to thrustwise movement may be used.

The resultant motion is such, so far as the reed structure alone is concerned, that for about one-half of the cycle of motion of stud 18a (i. e., in which 18a passes here under 16) the reed structure stands substantially at dwell, being then retracted and the link 22 swinging idly about pivot 20, and in the remaining portion of the cycle the pitman acts through link 22 to shift the reed structure anti-clockwise, or toward the fell of the cloth, and back. See Fig. 3. In other words, besides obtaining a dwell of the reed which is practically absolute during all that period represented by the said one-half cycle of motion of 18a, I obtain a quick beat-up of the reed structure so that filling is brought up to the cloth with proper force.

In the construction as actually shown the mechanism coordinates the motions of the reed structure and feeder in the following way, to wit: Whereas the reed structure performs its full forward-and-back movement during one half-cycle of the driver, 15, or quickly, and remains at dwell during the other half-cycle, not only does the feeder's forward and back movement correspond to a full cycle (moving in consonance with the driver, whereby the filling is laid in the shed gradually or without jerky action) but it is when the feeder is moving back and forward in what may be regarded as the rearward half of its cycle of movement and hence is out of the way of the reed structure that the full forward-and-back movement of the reed structure occurs, each dwell of the reed structure occurring when the feeder is in the other or forward half of its cycle of movement. This is shown by the diagram, Fig. 4, where the circle represents the path of the studs 14 and 18a, and where while assuming 14 to be passing backward and forward through the rearward half a—b of its cycle, the stud 18a will be performing its full forward-and-back movement as it passes from c to d, to of course remain at dwell while stud 14 proceeds to move from b to a. The parts thus coact without interference with each other and by keeping the feeder's motion substantially non-intermittent and applying the intermittence of motion to the reed structure I as indicated avoid jerking action of the feeder on the filling, obtain an effective beating up of the filling by the reed structure and still am able to drive the loom in practice at an exceedingly high rate of speed.

Having thus fully described my invention what I claim is:

1. A loom including a pivoted beating-up device having a pivot eccentric of its pivoting axis, a pitman having a pivot, means to confine the pivot portion of the pitman to substantially thrustwise movement in a line close to and crossing the axis of said device, means to reciprocate the pitman, said beating-up device being pivotally movable to and from a position where as regards its said pivot and its pivoting axis one of the latter is substantially between the other and the second means, and a link connecting the pivots of said device and the pitman.

2. A loom including a forward-and-back moving feeder for incorporating filling loops formed in the shed of a fabric-and-warp sheet, a pivoted beating-up device having a pivot eccentric of its pivoting axis, a pitman having a pivot, means to confine the pivot portion of the pitman to substantially thrustwise movement in a line close to and crossing the axis of said device, means to reciprocate the pitman, said beating-up device being pivotally movable to and from a position where as regards its said pivot and its pivoting axis one of the latter is substantially between the other and the second means, a link connecting the pivots of said device and the pitman, and means operatively connecting the feeder and second means for moving the feeder in substantial consonance with the driver.

In testimony whereof I affix my signature.

FRANK W. MERRICK.